(12) United States Patent
Yeager

(10) Patent No.: US 10,914,673 B2
(45) Date of Patent: Feb. 9, 2021

(54) DEVICE AND METHODS FOR TORQUE MEASUREMENT OF FRICTION VIA PULSED INTERFERENCE CONTACT

(71) Applicant: COVESTRO LLC, Pittsburgh, PA (US)

(72) Inventor: Mark A. Yeager, McKees Rocks, PA (US)

(73) Assignee: Covestro LLC, Pittsburgh, PA (US)

( * ) Notice: Subject to any disclaimer, the term of this patent is extended or adjusted under 35 U.S.C. 154(b) by 287 days.

(21) Appl. No.: 16/050,452

(22) Filed: Jul. 31, 2018

(65) Prior Publication Data

US 2020/0041404 A1 Feb. 6, 2020

(51) Int. Cl.
*G01N 19/02* (2006.01)
*G01N 3/56* (2006.01)

(52) U.S. Cl.
CPC ............... *G01N 19/02* (2013.01); *G01N 3/56* (2013.01); *G01N 2201/022* (2013.01); *G01N 2201/0696* (2013.01)

(58) Field of Classification Search
CPC .. G01L 3/02; G01L 5/24; G01N 19/02; G01B 7/34
USPC .................................................. 73/9, 862.08
See application file for complete search history.

(56) References Cited

U.S. PATENT DOCUMENTS

| 3,640,118 | A | 2/1972 | Gels |
| 4,594,878 | A | 6/1986 | Abe et al. |
| 4,722,218 | A | 2/1988 | Strader |
| 4,794,801 | A | 1/1989 | Andrews et al. |
| 6,199,424 | B1 | 3/2001 | Mani et al. |
| 7,250,038 | B2 | 7/2007 | Simpson et al. |
| 2003/0101793 | A1 | 6/2003 | Evans |
| 2004/0089053 | A1 | 5/2004 | Kaminski et al. |
| 2004/0187556 | A1 | 9/2004 | Abe et al. |

FOREIGN PATENT DOCUMENTS

| DE | 202005011365 | 3/2005 |
| EP | 0476747 | 9/1991 |
| JP | 59-077337 | 5/1984 |
| JP | S6088352 A | 5/1985 |
| JP | 62-118239 | 5/1987 |
| JP | 62-118240 | 5/1987 |
| JP | 01-201134 | 8/1989 |
| JP | H04355334 A | 12/1992 |
| JP | 2003232721 | 8/2003 |
| JP | 2017096845 | 6/2017 |
| WO | 1997031258 | 8/1997 |

*Primary Examiner* — Benjamin R Schmitt
(74) *Attorney, Agent, or Firm* — Richard P. Bender

(57) ABSTRACT

A device for torque measurement of friction includes a cylindrical core and a cap with a central cavity for receiving the cylindrical core. The cap includes at least one protrusion or indent on an inner surface, and the cylindrical core includes at least one protrusion or indent on an exterior surface. The device includes at least one protrusion to provide a pulsed interference contact with a second protrusion or indent on the cylindrical core or cap as the protrusion moves into and out of contact with the at least one second protrusion or indent when the cap is rotated about the cylindrical core. The device may be connected to a test apparatus configured to measure rotational torque between the cap and cylindrical core as they rotate with respect to one another.

20 Claims, 8 Drawing Sheets

DEVICE AND METHODS FOR TORQUE MEASUREMENT OF FRICTION VIA PULSED INTERFERENCE CONTACT

FIELD

The present invention relates generally to a device for measurement of friction, and more specifically to a test device configured to provide pulsed interference contact on rotation between parts of the device allowing for torque measurement of friction.

BACKGROUND

When two materials slide against each other, it is often desirable to have smooth contact between surfaces of the materials to reduce friction at the contact area. For a given pair of sliding surfaces, the magnitude of friction can be given by the coefficient of friction. Lowering the coefficient of friction generally leads to improved wear and ease of use for devices utilizing such sliding surfaces.

An important area of application where smoothly sliding materials are needed is in medical devices such as drug injection systems. Pen injectors, which are used to deliver therapeutic agents, are one example of such systems and include components commonly made of polymeric materials such as thermoplastics. These devices have components in contact with each other that must move or slide relative to each other during use, leading to friction between surfaces of the components. If friction is reduced between these components, smoother operation and longer use of the injection system may be achieved. Moreover, reducing the friction between components may prevent jamming of the device and failure to deliver the therapeutic agents, and/or failure of various locking mechanisms such as safety guards to move into position.

Advances in polymer technologies have allowed manufacturers to mold plastics into various medical parts having precise dimensions. Current testing methods for friction are not amenable for evaluation of friction between parts under the high force loads, and/or after multiple start and stop cycles that such parts experience in use. It is also important that the magnitude and "feel" of the friction between surfaces is testable, and within an expected range for the user (e.g., medical staff, patient). Accordingly, there currently exists a need in the industry for a device and method to reproducibly test the friction between parts formed of various polymers, and under different force loads.

SUMMARY

The presently disclosed invention provides a device that affords a pulsed interference contact during rotation between parts of the device allowing for reproducible and accurate torque measurement of friction. The device generally comprises a cylindrical core having an exterior surface with at least one protrusion or indent, and a cap having a central cavity with at least one protrusion or indent. The cylindrical core is received coaxially within the central cavity of the cap so that a top end of the cylindrical core is proximal to a first end of the cap. The device includes at least one first protrusion on the cylindrical core or cap that provides a pulsed interference contact with at least one of a second protrusion or an indent on the other of the cylindrical core or the cap, wherein the cap may rotate about the core.

According to certain aspects of the invention, the device may comprise at least one protrusion on each of the cylindrical core and the cap.

According to certain aspects of the invention, the device may comprise at least three protrusions on either the cylindrical core or the cap, and at least three indents on the other of the cylindrical core or the cap.

According to certain aspects of the invention, the device may comprise at least three protrusions equally circumferentially spaced about the surface of the central cavity of the cap, wherein each protrusions extends axially along at least a portion of the surface of the central cavity. Moreover, the device may comprise at least three indents equally circumferentially spaced about the exterior surface of the cylindrical core, wherein each indent extends axially along at least a portion of the exterior surface of the cylindrical core.

According to certain aspects of the invention, at least one of the at least three protrusions about the surface of the central cavity of the cap is a flat surface.

According to certain aspects of the invention, a size of the indent(s) may be substantially the same as a size of the protrusion(s).

According to certain aspects of the invention, the cap may further comprise at least one stop on the surface of the central cavity proximal to the first end of the cap, the at least one stop sized and positioned to limit an axial depth of the cylindrical core within the cap. For example, the at least one stop may comprise at least three projections radially spaced about the longitudinal axis. According to certain aspects of the invention, a bottom edge of the stop may contact an uppermost surface of the cylindrical core.

According to certain aspects of the invention, the cap may further comprise a cap attachment element on an exterior surface for engaging a first attachment mechanism of a torque measurement device.

According to certain aspects of the invention, the cylindrical core may further comprise a core attachment element on a bottom end for engaging a second attachment mechanism of a torque measurement device.

According to certain aspects of the invention, the cylindrical core may include a taper from a bottom end of the cylindrical core to the top end thereof defined by an angle of greater than zero to 10 degrees. Moreover, the cap may include a taper from a second end of the cap to a first end thereof, wherein the taper of the cap may be the same as or substantially the same as a taper of the cylindrical core.

According to certain aspects of the invention, a distance between the exterior surface of the cylindrical core and the surface of the central cavity of the cap may be less than 0.2 mm, such as less than 0.1 mm, when the cylindrical core is received with the central cavity of the cap. This first distance or gap tolerance may be between portions of the surface of the central cavity of the cap and the exterior surface of the cylindrical core that do not include the protrusion(s) or indent(s). A second gap tolerance may be defined between these latter surfaces, i.e., regions that do include the protrusion(s) and indent(s). According to certain aspects of the invention, the second gap tolerance may be the same or different from the first gap tolerance According to certain aspects of the invention, the cap and/or the cylindrical core may comprise an opening configured to relieve fluid pressure when the cylindrical core is received within the cap, wherein the fluid pressure comprises an air pressure. The opening may be coaxial with the longitudinal axis of the device (i.e., coaxial with the first and second fixtures of the device). For example, the opening of the cap may be radially centered at the first end of the cap, and the opening of the cylindrical core may be coaxial with the first and second fixtures, such as a central bore along the longitudinal axis of the cylindrical core.

According to certain aspects of the invention, the cylindrical core and the cap are each formed of a polymeric material. Additionally, the polymeric material of the cylindrical core and the polymeric material of the cap may be the same or may have shrinkage rates and amounts that are the same.

The present invention is also related to a method for torque measurement of friction between two surfaces using the devices according to any of the aspects disclosed above. The method may generally comprise connecting a core attachment element of a cylindrical core to a first connection mechanism or part of a test apparatus, positioning the cap on the cylindrical core, and connecting the cap to a second connection mechanism or part of the test apparatus via a cap attachment element. These first three steps may occur in any order. Rotation of either the first or second connection mechanisms or parts of the test apparatus may be initiated so that the cylindrical core and the cap rotate relative to one another. This rotation provides a pulsed interference contact between at least one first protrusion on one of the cap or cylindrical core and at least one of a second protrusion or an indent on an opposite part as the at least one first protrusion moves into and out of contact with the at least one second protrusion or indent on the opposite part.

According to certain aspects of the methods of the invention, the test apparatus may comprise a torque sensor for measuring an amount of torque exerted on the first connection part or the second connection part, and the method may further comprise recording the amount of torque measured during rotation of the cylindrical core and the cap relative to one another.

According to certain aspects of the methods of the invention, the test apparatus may comprise a first motor configured to cause rotation of the first connection part, and a torque sensor for measuring an amount of torque exerted on the second connection part, and the method may further comprise recording the amount of torque measured during rotation of the cylindrical core and the cap relative to one another.

According to certain aspects of the methods of the invention, the test apparatus may further comprise a second motor configured to exert an axial pressure on one of the first and second connection parts, and the method may further comprise applying a fixed load between the cylindrical cap and the cylindrical core during rotation of the cylindrical core and the cap relative to one another.

BRIEF DESCRIPTION OF DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the present invention, unless stated to be otherwise, are not necessarily drawn to scale.

DETAILED DESCRIPTION

Figure 1:
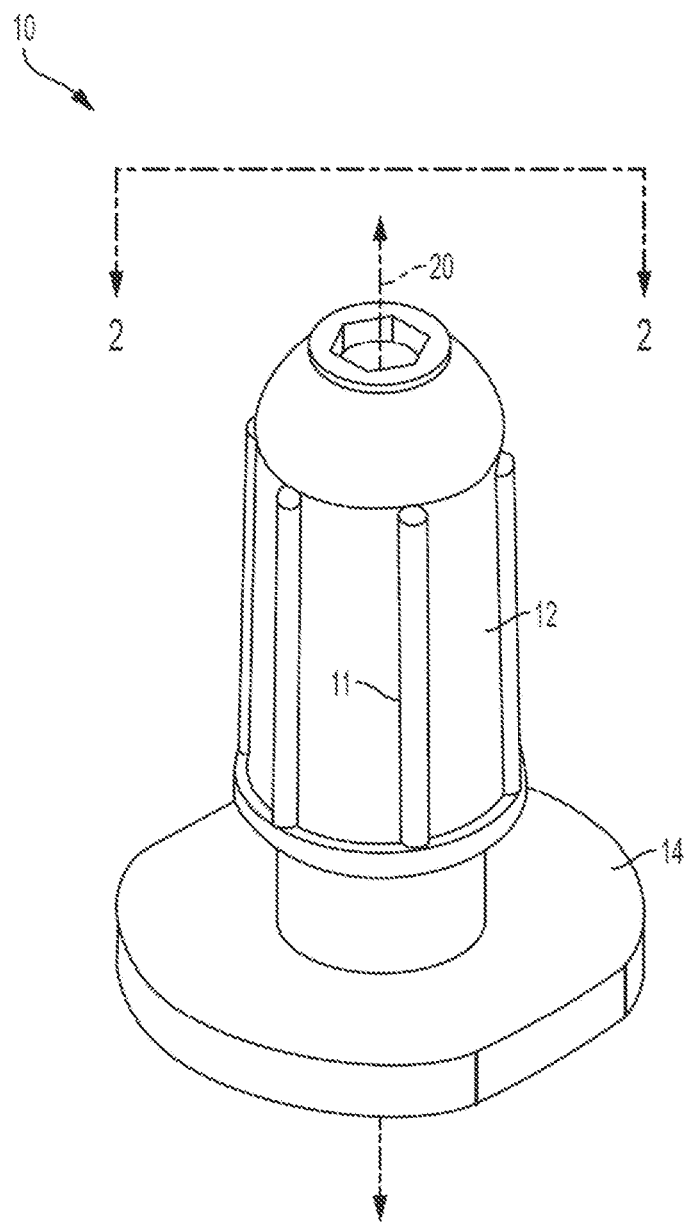
FIG. 1 illustrates a perspective view of a device for torque measurement of friction in accordance with certain aspects of the presently disclosed invention.

In the following description, the present invention involves devices and methods for torque measurement of friction. The above summary and drawings are not intended to describe or show each illustrated embodiment or every possible implementation of the presently disclosed devices and methods. Rather, various aspects of the devices and methods disclosed herein are described and illustrated with reference to one or more exemplary implementations. As used herein, the term "exemplary" means "serving as an example, instance, or illustration," and should not necessarily be construed as preferred or advantageous over other variations of the devices or methods disclosed herein. "Optional" or "optionally" means that the subsequently described component, event, or circumstance may or may not occur, and that the description includes instances where the event occurs and instances where it does not. In addition, the word "comprising" as used herein means "including, but not limited to".

Various aspects of the devices disclosed herein may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Relative terms such as "lower" or "bottom" and "upper" or "top" may be used herein to describe one element's relationship to another element illustrated in the drawings. It will be understood that relative terms are intended to encompass different orientations of aspects of the apparatus in addition to the orientation depicted in the drawings. By way of example, if aspects of the cylindrical core shown in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

It must also be noted that as used herein and in the appended claims, the singular forms "a", "an", and "the" include the plural reference unless the context clearly dictates otherwise. For example, although reference is made herein to "a" cap, "an" opening, or "the" cylindrical core, one or more of any of these components and/or any other components described herein can be used.

Unless defined otherwise, all technical and scientific terms used herein have the same meanings as commonly understood by one of ordinary skill in the art.

The present invention provides a simplified means for torque measurement of friction, and allows for rapid and accurate comparisons of various materials and combinations of materials. Moreover, the cap-like design of the devices provides a suitable means for evaluation of the "feel" of the frictional forces between parts, e.g., allows a user to rotate parts relative to each other to manually gauge the friction between various materials and combinations of materials.

Advances in polymer technologies have allowed manufacturers to generate new plastics and mold these plastics into various medical devices having precise dimensions. Standard test methods for friction do not adequately represent what happens in interference fits and in applications in which the friction is encountered repeatedly, such as through repeated uses of the medical devices. Moreover, the standard test methods are not amenable for evaluation of friction between parts under the high force loads and/or after multiple start and stop cycles, such as the sliding parts of certain medical devices.

The presently disclosed devices and methods provide a means to generate more useful data for comparison of these new plastics and for demonstrating improvements in the plastics and polymers used in forming these medical devices. For example, the presently disclosed device provide a means to test the sliding friction that occurs with internal features, such as when a cap slides over ridges or bumps in a mating part or the triggering mechanism in a safety syringe. In this latter example, if the friction between the flexed fingers that slide a distance before snapping into detents to lock the mechanism is too high to consistently drive the mechanism the entire distance by the spring, the mechanism will fail to lock. This could result in an accidental needle stick and subsequent health concerns.

The presently disclosed invention includes a device comprising a pair of parts which are designed to fit together. At least one of the parts comprises a protrusion that provides a pulsed interference contact between the parts as they rotate with respect to each other. Specifically, the parts include a cylindrical core receivable within a central axial bore of a cap. Mating surfaces between the cylindrical core and the cap are configured to provide at least one point of interference during each 360 degree rotation of the cap with respect to the cylindrical core.

In general, the number of interference points is chosen to assure an equal distribution of force. As such, according to certain aspects of the invention, three or more equally spaced interference points may be included.

The cap and cylindrical core are designed to engage a torque tester to measure the frictional resistance to torque in pulses, such as one or more pulses per rotation. The peak values of torque can be compared between grades of plastic to determine differences in the initial friction and the friction after any number of pulses (e.g., rotations of the cap with respect to the cylindrical core).

Referring now to the drawings, a device according to various aspects of the presently disclosed invention is shown in FIGS. 1-7 generally designated by the reference numeral 10. FIG. 1 illustrates the device 10 including a cylindrical cap 12 having a central cavity in which a cylindrical core 14 is received so that the cap 12 and cylindrical core 14 are coaxial with each other along a longitudinal axis (arrow 20).

Also shown in FIG. 1 are ridges 11 on an exterior surface of the cap 12, and a flange on a base of the cylindrical core 14. A user may grip the ridges 11 and the flange to actuate rotation of the cap 12 with respect to the cylindrical core 14, and thus "feel" the friction between the parts (i.e., the resistance to rotation). A user may compare parts made from different polymers or comprising different additives. While specific means for manually engaging rotation between parts is shown, e.g., ridges 11 and a flange, other implementations are possible and within the scope of the present invention. For example, indents or a roughened surface could be provided on the cap 12, and/or a handle or extended base having ridges, indents, or a roughened surface could be provided on the cylindrical core 14.

Figure 2:
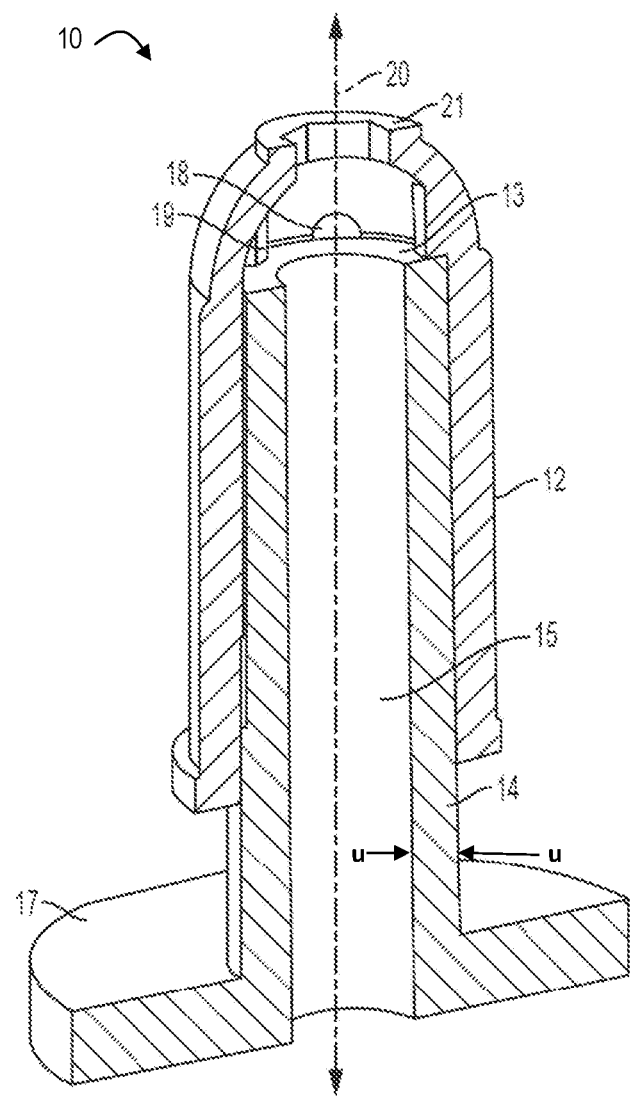
FIG. 2 illustrates a cross-sectional view taken along line 2-2 of the device shown in FIG. 1.

FIG. 2 shows a cross-sectional view of the device 10 taken along line 2-2 of FIG. 1. The cap 12 is shown with the cylindrical core 14 received therein such that a top end 13 of the cylindrical core 14 is proximal to a first end 21 of the cap 12. An axial position or depth of the cylindrical core 14 within the central cavity of the cap 12 may be limited by at least one stop 19 positioned on a surface of the central cavity proximal to the first end of the cap. The stop 19 may be sized and positioned to abut the top end 13 of the cylindrical core 14. For example, the stop 19 may extend radially inward (i.e., radial projection) so that a bottom end of the stop 19 contacts the top end 13 of the cylindrical core 14.

With continued reference to FIG. 2, the cylindrical core 14 is shown to include a central bore 15 extending through the entire axial length of the cylindrical core 14. Moreover, the cap 12 is shown to have an opening at the first end 21. Either or both of the central bore 15 of the cylindrical core 14 and the opening at the first end 21 of the cap 12 may be included in the device 10 to provide access passageways to relieve a fluid pressure, e.g., air pressure, when the cylindrical core 14 is received in the cap 12. Moreover, either or both passageways may be included to assist in production of the cap 12 and cylindrical core 14 of the device 10.

According to certain aspects of the invention, neither of the central bore 15 of the cylindrical core 14 and the opening at the first end 21 of the cap 12 are included in the device 10. In such an instance, a gap between the inner surface of the central cavity of the cap 12 and the outer surface of the cylindrical core 14 may be large enough that air captured between parts may escape (i.e., may not be captured therebetween) when the parts are connected. Additionally, while specific positions of these openings (15, 21) are shown, other positions are possible and within the scope of the presently disclosed invention.

Figure 3:
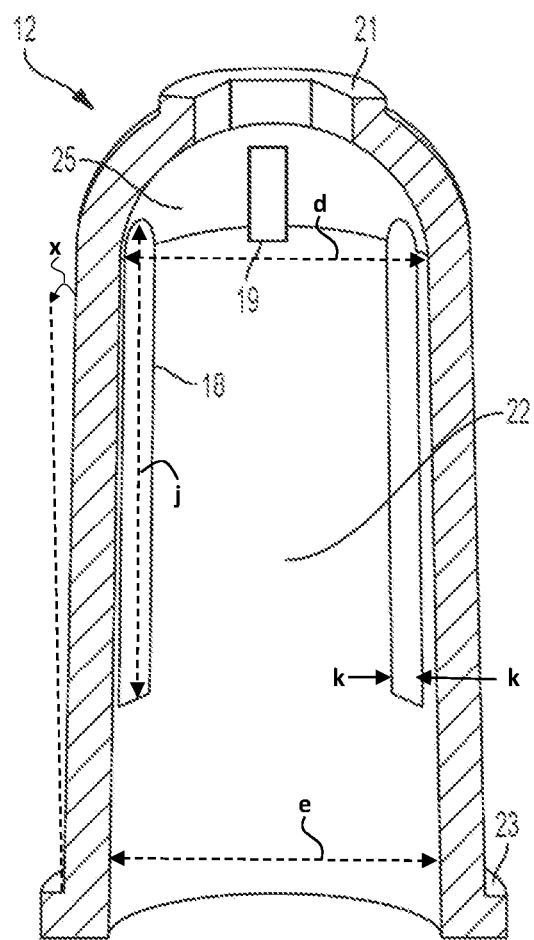
FIG. 3 illustrates a cross-sectional view taken along line 2-2 of a cap portion of the device shown in FIG. 1.

FIG. 3 illustrates a cross sectional view of the cap 12 taken along an axial plane rotated relative to the view shown in FIG. 2. An inner surface 22 of the central cavity of the cap 12 is shown to include at least one axially extending protrusion 18. Also shown is the stop 19 positioned on an inner surface 25 of the central cavity of the cap 12 proximal to the first end 21 thereof.

Figure 4:
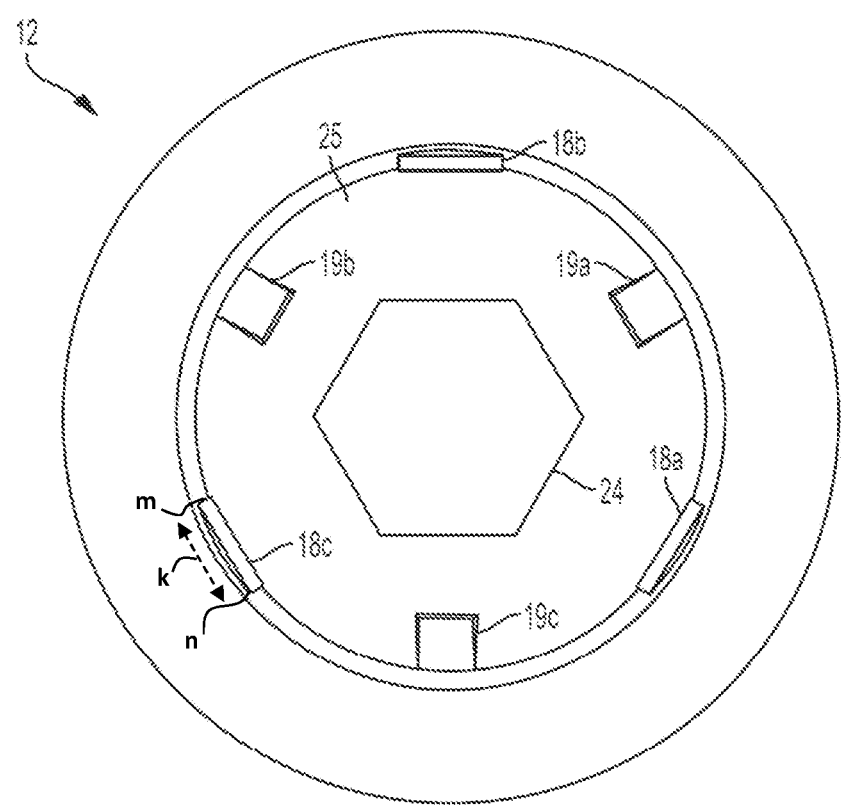
FIG. 4 illustrates a bottom view of the cap portion of the device shown in FIG. 1.

As shown in FIG. 4, which is a view of the inner cavity of the cap 12 from an open second or bottom end, the cap 12 may include more than one stop (19a, 19b, 19c) and more than one axially extending protrusion (18a, 18b, 18c). The stops may be circumferentially spaced on the inner surface 25 of the cap 12. According to certain aspects of the invention, the stops (19a, 19b, 19c) may be evenly spaced about a circumference of the cap 12, as shown in FIG. 4, and may be configured as projections. Moreover, the axially extending protrusions (18a, 18b, 18c) may be circumferentially spaced on the inner surface 22 of the cap 12. According to certain aspects of the invention, the protrusions (18a, 18b, 18c) may be evenly spaced about a circumference of the cap 12.

Figure 5:
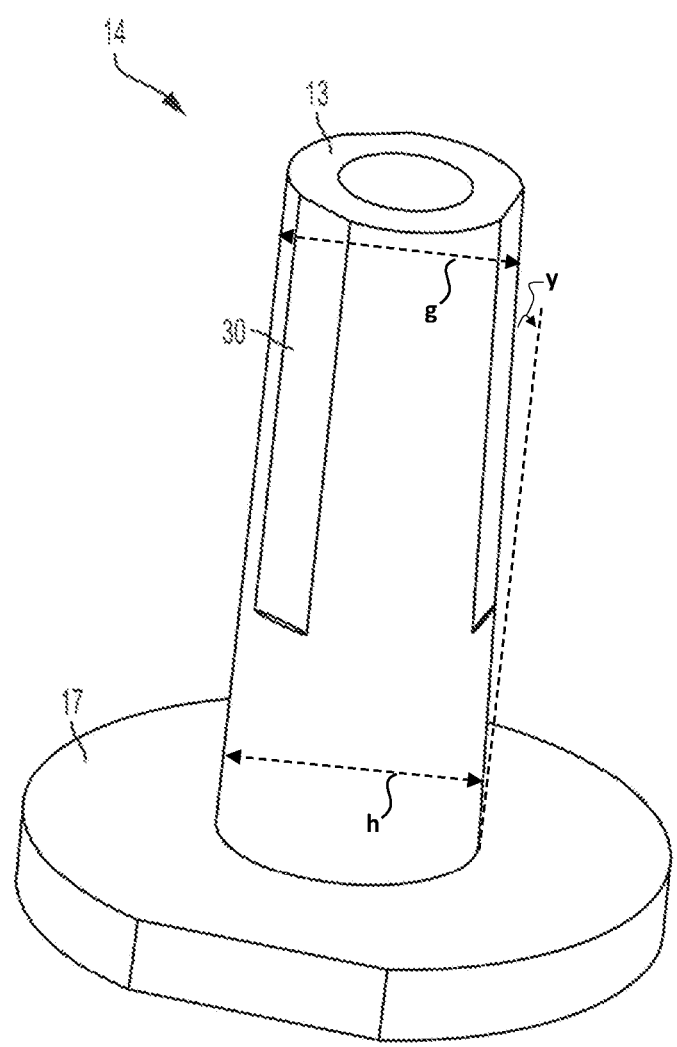
FIG. 5 illustrates a perspective view of a cylindrical core portion of the device shown in FIG. 1.

The cylindrical core 14 may include at least one axially extending recess or indent 30 on an exterior surface, as shown in FIG. 5. A size of the at least one indent 30 on the cylindrical core 14 may be substantially the same as a size of the at least one protrusion 18 on the cap 12 so that rotation of the cylindrical core 14 and the cap 12 relative to one another about the longitudinal axis 20 provides a pulsed interference contact therebetween as the at least one protrusion 18 moves into and out of contact with the at least one indent 30.

The cylindrical core 14 may include any number of axially extending indents 30 circumferentially spaced about the exterior surface of the cylindrical core. Moreover, the cap 12 may include any number of axially extending protrusions 18 circumferentially spaced about the central cavity of the cap 12. These complementary surfaces are configured to provide points of interference as the cap 12 and cylindrical core 14 rotate with respect to one another.

As shown in the figures, the device 10 may include three indents 30 and three protrusion 18, which provide three points of interference. While shown in the figures to include three indents 30 and three protrusion 18, the device 10 may include any number of interference points that may provide force on each of the cylindrical core 14 and cap 12 (i.e., force during connection and/or rotation of parts when used for torque measurement). According to certain aspects of the invention, the cylindrical core 14 and cap 12 may each include a number and positioning of interference points (i.e., indents 30 and protrusion 18) that may provide an equal distribution of force therebetween.

As such, according to certain aspects of the invention, three or more interference points may be included, such as four, five, six, seven, eight, nine, etc. In a preferred embodiment, the device 10 includes three equally spaced axially extending indents 30 about a circumference of the outer surface of the cylindrical core 14 and three equally spaced axially extending protrusions 18 about a circumference of the inner surface 22 of the central cavity of the cap 12, which provides even distribution of forces and clear separation between torque readings as the cap 12 and cylindrical core 14 rotate relative to each other (see FIGS. 8 and 9).

As shown in the figures, the device 10 includes three indents 30 on the cylindrical core 14 and three protrusions 18 on the surface of the central cavity of the cap 12. However, the device 10 may include protrusions and/or indents on the cylindrical core 14 and protrusions and/or indents on the cap 12 as long as the device 10 includes at least one protrusion. For example, the device 10 may include at least one protrusion on each of the cylindrical core 14 and the cap 12 and no indents, or may further include indents on either or both of the cylindrical core 14 and the cap 12. Alternatively, the device 10 may include protrusions on the cylindrical core 14 and indents on the surface of the central cavity of the cap 12. Any combination of protrusions and indents is envisioned and within the scope of the presently disclosed invention as long as one of the cylindrical core 14 or the cap 12 includes at least one projection.

The cap 12 and cylindrical core 14 are designed to engage a torque tester to measure the frictional resistance to torque in pulses, such as one or more pulses per 360 degree rotation as the one or more protrusions 18 and/or indents 30 are rotated out of alignment with one another (i.e., rotated so there is interference contact between parts). The peak values of the measured torque can be compared between grades of plastic to determine differences in the initial friction and after any number of pulses. The cylindrical core 14 may include a core attachment element 17 configured to engage or provide attachment to a first connection mechanism on the torque tester. For example, as shown in FIG. 5, core attachment element 17 may be a circumferential flange positioned on a bottom end of the cylindrical core 14, opposite from the top end 13. The flange may be clamped into place on the first connection mechanism of the torque tester. The core attachment element 17 may be any portion of the cylindrical core 14 designed and configured to provide connection with any of a range of standard connection mechanisms on a torque tester.

The cap 12 may include a cap attachment element 21 on an exterior surface of the first end thereof configured to engage or provide connection to a second connection mechanism on the test apparatus. The cap attachment element 21 may be, for example, a radially centered hex shaped opening, as shown in FIG. 1. The cap attachment element 21 may be any portion of the cap 12 designed and configured to provide connection with any of a range of standard connection mechanisms on a torque tester.

Once the cap 12 and cylindrical core 14 are engaged on the test apparatus, rotation of one or both of the first and second connection mechanism may provide rotation of the cap 12 with respect to the cylindrical core 14. For example, the torque measurement apparatus from Mecmesin Corporation of Sterling, Va. includes a motor that provides rotation of the first attachment mechanism, and thus rotation of the cylindrical core 14. This testing apparatus further includes a torque sensor that measures an amount of torque applied to the second connection mechanism as the first connection mechanism rotates, such as when the cap 12 rotates about the cylindrical core 14.

This testing apparatus may also provide a measured axial force on the cap 12 (e.g., downward or upward along axis 20 of the device), or in the alternative, a measure axial force on the cylindrical core 14 to provide addition friction between the parts and thus a measurable increase in the torque on the first and/or second connection mechanism.

While discussed with respect to a specific apparatus type, i.e., the torque measurement apparatus from Mecmesin Corporation, and means for connection of the device 10 to the test apparatus, i.e., rotate the cylindrical core 14 while the cap 12 is held in place, other apparatus and means for measuring the torque are envisioned and within the scope of the presently disclosed invention. For example, the cap 12 may be rotated while the cylindrical core 14 is held in place. Alternatively, both the cylindrical core 14 and the cap 12 may be rotate, such as in opposite directions, or in the same direction but at different speeds.

The inner cavity of the cap 12 may be sized and configured to accept the cylindrical core 14 with a small distance therebetween, i.e., distance between an outer surface of the cylindrical core 14 and an inner surface of the central cavity of the cap 12. This distance, or gap, may define a first gap tolerance between an outer diameter of the cylindrical core 14 and an inner diameter of the central cavity of the cap 12. The first gap tolerance has been found to affect the amount or magnitude of torque measured during rotation of the cap 12 with respect to the cylindrical core 14. Note, the first gap tolerance is measured for the cylindrical core and/or inner cavity of the cap in regions not occupied by an indent or protrusion, respectively.

In addition to the first gap tolerance, the size and shape of the indents 30 on the cylindrical core 14 and the protrusions 18 on the inner cavity of the cap 12 may affect the magnitude of torque measured during rotation of the cap 12 with respect to the cylindrical core 14. Moreover, the materials selected for production of the cap 12 and cylindrical core 14 of the device 10 will also affect the magnitude of torque measured during rotation therebetween.

According to certain aspects of the invention, and with reference to FIG. 3, the protrusions 18 may extend over a longitudinal length "j" of the inner cavity of the cap of at least 30% of the total length thereof, such as at least 40%, or 50%, or 60%, or even 70%. The protrusions 18 may have a width "k" that is at least 2% of the circumference of the inner cavity of the cap 12, such as 4%, or 6%, or 8%, or even 10%.

According to certain aspects of the invention, the protrusions 18 may represent a flattened region on the inner cavity, as shown in FIG. 4. That is, the protrusions 18 may be a flat area extending the width k from a first point "m" on the inner cavity wall of the cap to a second adjacent point "n" on the inner cavity wall. For example, the protrusions 18 may represent a subset of sides of an inscribed polygon within the central cavity of the cap 12.

The indents 30 on the cylindrical core 14 may have a length and width that is substantially the same as the length j and width k of the protrusions 18. According to certain aspects of the invention, the indents 30 may be configured as a flattened region on the cylindrical core 14 which is complementary to the flattened regions on the cap 12. A distance between the indents and the protrusions, when mated, i.e., when the cylindrical core 14 is received within the cap 12 so that the indents 30 and protrusions 18 are aligned, may define a second gap tolerance.

According to certain aspects of the invention, the second gap tolerance may be that same as the first gap tolerance, or may be different from the first gap tolerance. According to certain aspects of the invention, the first gap tolerance may be less than 1 mm, such as less than 0.5 mm, 0.4 mm, 0.3 mm, 0.2 mm, 0.1 mm, 0.05 mm, or even less than 0.01 mm, but non-zero. As such, the torque measured between parts as they rotate out of alignment (i.e., indents 30 and protrusions 18 are not aligned so that there is interference or contact between parts) will have a maximum value and the torque measured between parts as they rotate into alignment (i.e., indents 30 and protrusions 18 are aligned so that there is no interference between parts) may have a minimum value of zero. As discussed above, the maximum value of the torque may depend on any of the gap tolerance, the polymer of the devices, and the size and shape of the indent(s) 30 and protrusion(s) 18.

According to certain aspects of the invention, the first and second gap tolerances may be zero, or there may be interference between parts even when the indents 30 and protrusions 18 are aligned. In this latter instance, the torque measured between parts as they rotate into alignment (i.e., indents 30 and protrusions 18 are aligned) will have a minimum value that is not zero. Certain medical devices operate under such stress, where parts are placed into interference fits that oscillate between two non-zero values. The ability to understand the frictional forces for parts under such stress is an advantage of the presently disclosed device.

According to certain aspects of the invention, the first and second gap tolerances may be varied to provide testing for different levels of friction between devices. For example, the first and second gap tolerances may be larger for devices formed of polymeric materials having high frictional forces therebetween. Alternatively, the first and second gap tolerances may be smaller for devices formed of low friction polymeric materials.

As shown in FIG. 3, an inner diameter "e" near the second end of the cap 12 may be larger than an inner diameter "d" near a first end of the cap 12, to form a taper having an angle "x". The angle x may deviate from the longitudinal axis, i.e. be greater than zero degrees, by up to 10 degrees, such as by up to 8 degrees, or up to 6 degrees, or up to 5 degrees, or up to 4 degree, or up to 3 degree, or up to 2 degree, or up to 1 degree. Likewise, and as shown in FIG. 5, an outer diameter "h" near the bottom end of the cylindrical core 14 may be larger than the outer diameter "g" near a top end of the cylindrical core 14, to form a taper having an angle "y". The angle y may deviate from the longitudinal axis, i.e. be greater than zero degrees, by up to 10 degrees, such as by up to 8 degrees, or up to 6 degrees, or up to 5 degrees, or up to 4 degree, or up to 3 degree, or up to 2 degree, or up to 1 degree.

According to certain aspects of the invention, the taper of the cap 12 may be substantially the same as the taper of the cylindrical core 14 so that the first and/or second gap tolerances remain unchanged over the length of contact between the parts.

The cap 12 and cylindrical core 14 of the device 10 may be formed of a polymeric material. The polymeric material for each part (12, 14) may be the same or may be different. The polymeric materials for each part (12, 14) may have the same shrinkage rate or may have different shrinkage rates.

The device 10 according to the present invention may provide means to measure rotational torque using any of a number of standard measurement or test apparatus, such as a torque measurement apparatus from Mecmesin Corporation of Sterling, Va.

A method of use of the presently disclosed devices for torque measurement of friction includes connecting a first fixture 17 of the cylindrical core 14 to a first connection part of the test apparatus, generally a stage that allows the flange to be clamped into place. The cap 12 may be positioned on the cylindrical core 14 so that the cylindrical core 14 is received within the central cavity to a depth defined by the stop(s) 19 on the cap 12. The cap 12 may be connected to a second connection part of the test apparatus via the second fixture 21 of the cap 12. For example, the test apparatus may include a second connection part configured as a hex wrench which may be positioned within the hex shaped opening (FIG. 1) at the first end of the cap 12. These three steps, connection of the cap and the core to the test apparatus and connection of the core to the cap, may be performed in any order.

Either the first or second connection mechanism, or a portion thereof, of the test apparatus may be configured to rotate, and thus provide rotation of either of the cylindrical core or the cap, respectively. As such, the method of use of the device 10 may include initiating rotation of either the first or second connection parts of the test apparatus so that either the cylindrical core 14 or the cap 12 rotate relative to one another. The other of the first or second connection mechanism or part that does not rotate may comprise a torque sensor for measuring an amount of torque exerted on that connection mechanism or part during rotation of the cylindrical core 14 and the cap 12 relative to one another.

Rotation of the cylindrical core with respect to the cap will bring the indent(s) 30 into and out of contact with the protrusion(s) 18 in the cap, and thus provides a pulsed interference contact therebetween. The torque sensor will measure this pulse as peaks of torque that are related to the friction between the cylindrical core 14 and the cap 12 of the device 10 as a function of the number of rotations (i.e., wear on the parts after rotation between parts). These values may be recorded and graphed (see Examples, and FIGS. 8 and 9).

Example

Figure 7:
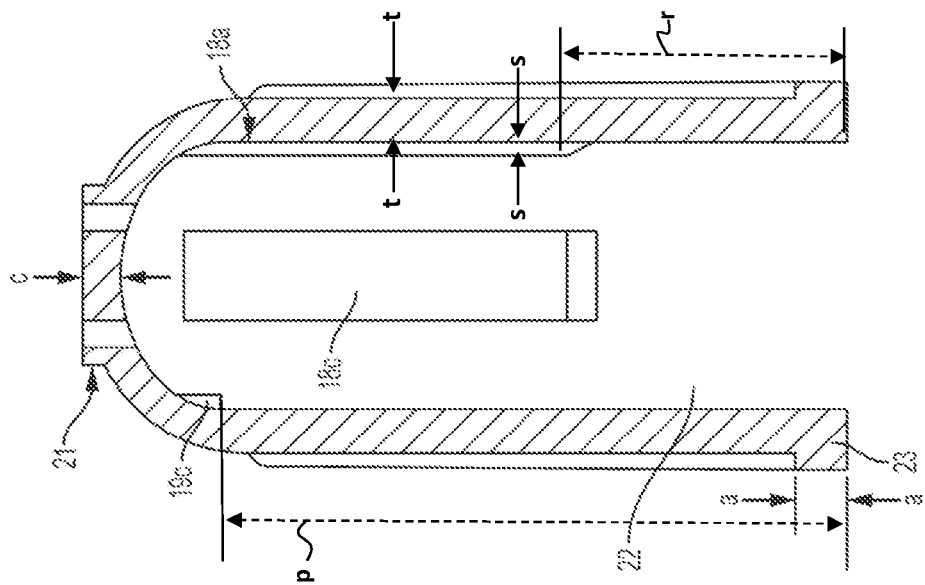
FIG. 7 illustrates a cross-sectional view taken along line 7-7 of the device shown in FIG. 6.
Figure 6:
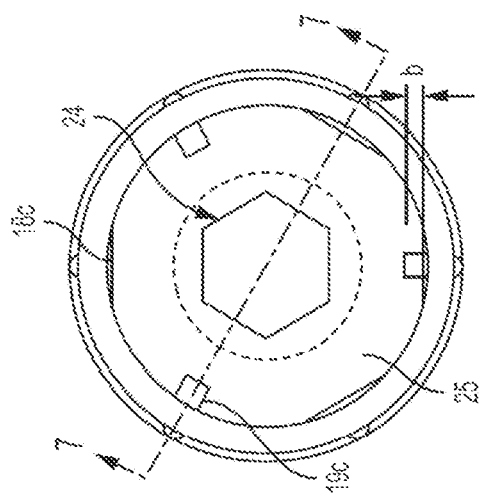
FIG. 6 illustrates a bottom view of a cap portion of a device for torque measurement of friction in accordance with certain aspects of the presently disclosed invention.
Figure 8:
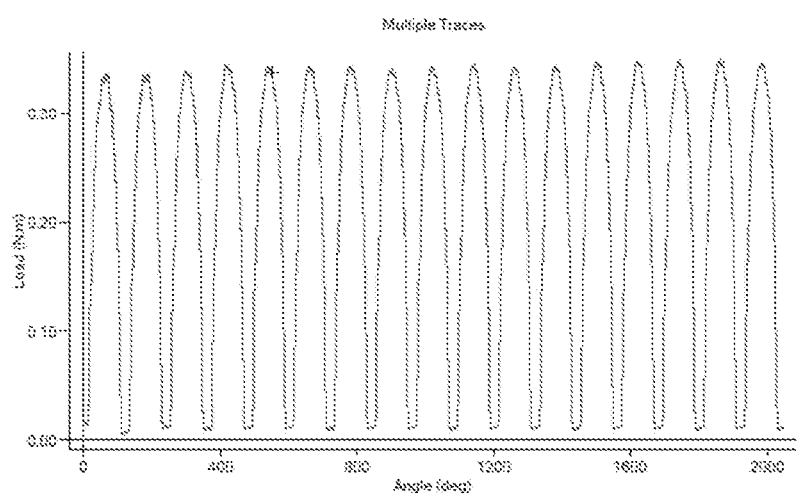
FIG. 8 is a graph showing test results for torque measurement of friction using the device shown in FIGS. 6 and 7 made from a first grade of polycarbonate.
Figure 9:
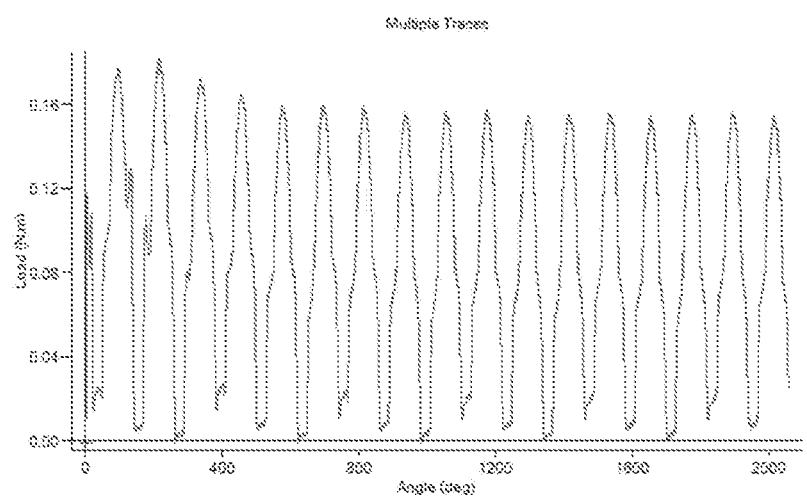
FIG. 9 is a graph showing test results for torque measurement of friction using the device shown in FIGS. 6 and 7 made from a second grade of polycarbonate.

Devices 10 according to the presently disclosed invention were formed of two different grades of a low friction polymeric material (Grade A and Grade B). Test results for parts formed with dimensions as discussed with reference to FIGS. 6 and 7 are shown in FIGS. 8 and 9. While specific dimensions and ranges of resulting torque measurements are shown and discussed herein, a wide range of other dimensions and magnitudes of torque measurement are within the scope of the presently disclosed invention.

With reference to FIGS. 6 and 7, a cap 12 was formed having a wall thickness "t" of 0.08 inches (0.2 cm), an axial height "p" of 1.225 inches (3.1 cm), and a dome shaped second end having an inner radius of 0.294 inches (0.75 cm). Also shown is the opening "c" that is part of the second fixture 21. Note that FIG. 7 is a cross-sectional view taken along line 7-7 from FIG. 6, wherein the cross section bisects a protrusion 18a and a stop 19c. A wall thickness of the cylindrical core 14 ("u" of FIG. 2) may be substantially the same as a wall thickness t of the cap 12 so that shrinkage rates and/or amounts of either part may be the same or substantially the same.

The diameter of the inner cavity of the cap 12 at the bottom end "e" is 0.588 inches (1.5 cm), while the diameter at the top end "d" is 1 degree less, or 0.567 inches (1.44 cm). A protrusion 18a may begin a distance "r" of 0.4 inches axially from a bottom or second end 23 of the cap 12. The protrusion may extend radially inward from the inner wall of the central cavity by a distance "s", at the widest point of the protrusion 18a, of 0.005 inches (0.0127 cm). Also shown in FIG. 7 is a ridge on an exterior surface of the cap 12 positioned along a bottom edge thereof, having a thickness "a" which may be variable and is provided to assist a user in connecting the cap 12 and the cylindrical core 14.

As shown in FIG. 6, the stop 19c may extend radially inward from the inner wall of the central cavity by a distance "b", at the widest point of the stop 19c, of 0.06 inches (0.015 cm). The dotted line provided in FIG. 6 shows the outline of the first fixture 21 provided at a first end of the cap 12.

For each device, the cap 12 and cylindrical core 14 were formed of the same low friction polymeric material (i.e., device A has cap 12 and cylindrical core 14 formed of Grade A, while device B has cap 12 and cylindrical core 14 formed of Grade B). As noted above, however, the cap 12 and cylindrical core 14 could have been formed of different polymeric materials.

As shown in FIGS. 8 and 9, the device formed from the Grade A polymer (FIG. 8, peaks of about 34 Nm) demonstrated a larger rotational torque than the device formed from the Grade B polymer (FIG. 9, peaks of about 15 Nm) when tested according to the presently disclosed methods. That is, the cylindrical core 14 was attached to a base platform or table of a Mecmesin Corporation Vortex-i test apparatus, and clamped into place. The cap 12 was then placed over the cylindrical core 14 and a hex shaped connection part of the test apparatus was positioned within the hex shaped opening on the first end of the cap 12.

Rotation of the base was initiated at 15 rpm (revolutions per minute) to start rotation of the cylindrical core 14, and a torque sensor connected to the hex shaped connection part of the test apparatus measured the torque on the cap 12 as a function of time, or degrees of rotation of the base. As shown in FIGS. 6 and 7, the cap 12 includes three protrusions 18 and the cylindrical core 14 includes three matched indents 30. As such, three pulses of torque load are apparent for each 360 degrees of rotation, which represent the points in rotation between the cap 12 and cylindrical core 14 when the protrusions 18 and indents 30 are out of alignment with each other. As indicated above, the torque measured for each grade of polymer is related to the frictional forces between the cap and cylindrical core of the device. Thus, the Grade A polymer has a higher frictional resistance between the cap 12 and cylindrical core 14 than the Grade B polymer.

The following aspects are disclosed in this application:

Aspect 1. A device for torque measurement of friction, the device comprising: a cylindrical core comprising an exterior surface having at least one protrusion or indent; and a cap having a central cavity in which the cylindrical core is received coaxially so that a top end of the cylindrical core is proximal to a first end of the cap, the cap comprising at least one protrusion or indent on a surface of the central cavity, wherein the device comprises at least one first protrusion on either of the cylindrical core or the cap, wherein the at least one first protrusion provides a pulsed interference contact with at least one of a second protrusion or an indent on the other of the cylindrical core or the cap when the cap may rotate about the core.

Aspect 2. The device according to aspect 1, wherein the device comprises at least one protrusion on each of the cylindrical core and the cap.

Aspect 3. The device according to aspects 1 or 2, wherein the device comprises at least three protrusions on either the cylindrical core or the cap, and at least three indents on the other of the cylindrical core or the cap.

Aspect 4. The device according to any of aspects 1 to 3, wherein the device comprises at least three protrusions equally circumferentially spaced about the surface of the central cavity of the cap, wherein each protrusions extends axially along at least a portion of the surface of the central cavity.

Aspect 5. The device according to any of aspects 1 to 4, wherein at least one of the protrusion(s) about the surface of the central cavity of the cap is a flat surface.

Aspect 6. The device according to any of aspects 1 to 5, wherein the device comprises at least three indents equally circumferentially spaced about the exterior surface of the cylindrical core, wherein each indent extends axially along at least a portion of the exterior surface of the cylindrical core.

Aspect 7. The device according to any of aspects 1 to 6, wherein a size of the indent(s) is substantially the same as a size of the protrusion(s).

Aspect 8. The device according to any of aspects 1 to 7, wherein the cap further comprises at least one stop on the surface of the central cavity proximal to the first end of the cap, the at least one stop sized and positioned to limit an axial depth of the cylindrical core within the cap.

Aspect 9. The device according to any of aspects 1 to 8, wherein the cap further comprises a cap attachment element on an exterior surface for engaging a first attachment mechanism of a torque measurement device.

Aspect 10. The device according to any of aspects 1 to 9, wherein the cylindrical core further comprises a core attachment element on a bottom end for engaging a second attachment mechanism of a torque measurement device.

Aspect 11. The device according to any of aspects 1 to 10, wherein the cylindrical core includes a taper from a bottom end of the cylindrical core to the top end thereof defined by an angle of greater than zero to 10 degrees.

Aspect 12. The device according to any of aspects 1 to 11, wherein the cap includes a taper from a second end of the cap to a first end thereof, wherein the taper of the cap is substantially the same as a taper of the cylindrical core.

Aspect 13. The device according to any of aspects 1 to 12, wherein a distance between the exterior surface of the cylindrical core and the surface of the central cavity of the cap is less than 0.1 mm.

Aspect 14. The device according to any of aspects 1 to 13, wherein either or both of the cylindrical core and the cap comprise an opening configured to relieve fluid pressure when the cylindrical core is received within the cap, wherein the fluid pressure comprises an air pressure.

Aspect 15. The device according to any of aspects 1 to 14, wherein the cylindrical core and the cap are each formed of a polymeric material.

Aspect 16. The device according to any of aspects 1 to 14, wherein the cylindrical core and the cap are each formed of a polymeric material, wherein the polymeric material of the cylindrical core and the polymeric material of the cap are the same or have shrinkage rates and amounts that are the same.

Aspect 17. A method for torque measurement of friction between two surfaces, the method comprising: connecting a core attachment element of a cylindrical core to a first connection part of a test apparatus, wherein the cylindrical core comprises at least one protrusion or indent on an exterior surface; positioning a cap on the cylindrical core, wherein the cap comprises a central cavity in which the cylindrical core is received coaxially so that a top end of the cylindrical core is proximal to a first end of the cap, wherein the cap comprises at least one protrusion or indent on a surface of the central cavity; and connecting a cap attachment element of the cap to a second connection part of the test apparatus. These first three steps may be performed in any order, after which the method comprises initiating rotation of either the first or second connection parts of the test apparatus so that the cylindrical core and the cap rotate relative to one another, wherein at least one of the cylindrical core and the cap comprises at least one first protrusion so that rotation of the cylindrical core and the cap relative to one another provides a pulsed interference contact between the at least one first protrusion and at least one of a second protrusion or an indent on the other part as the at least one first protrusion moves into and out of contact with the at least one second protrusion or indent on the other part.

Aspect 18. A method for torque measurement of friction between two surfaces, the method comprising: connecting a core attachment element of a cylindrical core of the device according to any of aspects 1 to 15 to a first connection part of a test apparatus; positioning a cap of the device according to any of aspects 1 to 15 on the cylindrical core; and connecting a cap attachment element of the cap to a second connection part of the test apparatus. These first three steps may be performed in any order, after which the method comprises initiating rotation of either the first or second connection parts of the test apparatus so that the cylindrical core and the cap rotate relative to one another.

Aspect 19. The method according to aspects 17 or 18, wherein the test apparatus comprises a torque sensor for measuring an amount of torque exerted on the first connection part or the second connection part, and the method further comprises recording the amount of torque measured during rotation of the cylindrical core and the cap relative to one another.

Aspect 20. The method according to aspects 17 or 18, wherein the test apparatus comprises a first motor configured to cause rotation of the first connection part, and a torque sensor for measuring an amount of torque exerted on the second connection part, and the method further comprises recording the amount of torque measured during rotation of the cylindrical core and the cap relative to one another.

Aspect 21. The method according to any of aspects 17 to 20, wherein the test apparatus further comprises a second motor configured to exert an axial pressure on one of the first and second connection parts, and the method further comprises applying a fixed load between the cylindrical cap and the cylindrical core during rotation of the cylindrical core and the cap relative to one another.

Aspect 22. The method according to any of aspects 17 to 21, wherein the cap comprises at least three protrusions and the cylindrical core comprises at least three indents, and a size of the at least three indents is substantially the same as a size of the at least three protrusions.

What is claimed is:

1. A device for torque measurement of friction, the device comprising:
   a cylindrical core comprising an exterior surface having at least one protrusion or indent; and
   a cap having a central cavity in which the cylindrical core is received coaxially so that a top end of the cylindrical core is proximal to a first end of the cap, the cap comprising at least one protrusion or indent on a surface of the central cavity,
   wherein the device comprises at least one first protrusion on either of the cylindrical core or the cap,
   wherein the at least one first protrusion provides a pulsed interference contact with at least one of a second protrusion or an indent on the other of the cylindrical core or the cap when the cap rotates about the core.

2. The device of claim 1, wherein the device comprises at least one protrusion on each of the cylindrical core and the cap.

3. The device of claim 1, wherein the device comprises at least three protrusions on either the cylindrical core or the cap, and at least three indents on the other of the cylindrical core or the cap.

4. The device of claim 1, wherein the device comprises at least three protrusions equally circumferentially spaced about the surface of the central cavity of the cap, wherein each protrusions extends axially along at least a portion of the surface of the central cavity.

5. The device of claim 4, wherein the device comprises at least three indents equally circumferentially spaced about the exterior surface of the cylindrical core, wherein each indent extends axially along at least a portion of the exterior surface of the cylindrical core.

6. The device of claim 5, wherein a size of the at least three indents is of substantially the same size as a size of the at least three protrusions.

7. The device of claim 4, wherein at least one of the at least three protrusions about the surface of the central cavity of the cap is a flat surface.

8. The device of claim 1, wherein the cap further comprises at least one stop on the surface of the central cavity proximal to the first end of the cap, the at least one stop sized and positioned to limit an axial depth of the cylindrical core within the cap.

9. The device of claim 1, wherein the cap further comprises a cap attachment element on an exterior surface for engaging a first attachment mechanism of a torque measurement device.

10. The device of claim 1, wherein the cylindrical core further comprises a core attachment element on a bottom end for engaging a second attachment mechanism of a torque measurement device.

11. The device of claim 10, wherein the cap includes a taper from a second end of the cap to a first end thereof, wherein the taper of the cap is substantially the same as the taper of the cylindrical core.

12. The device of claim 1, wherein the cylindrical core includes a taper from a bottom end of the cylindrical core to the top end thereof defined by an angle of greater than zero to 10 degrees.

13. The device of claim 1, wherein either or both of the cylindrical core and the cap comprise an opening configured to relieve fluid pressure when the cylindrical core is received within the cap, wherein the fluid pressure comprises an air pressure.

14. The device of claim 1, wherein the cylindrical core and the cap are each formed of a polymeric material.

15. The device of claim 14, wherein the polymeric material of the cylindrical core and the polymeric material of the cap are the same or have shrinkage rates and amounts that are the same.

16. A method for torque measurement of friction between two surfaces, the method comprising:
   (a) connecting a core attachment element of a cylindrical core to a first connection part of a test apparatus, wherein the cylindrical core comprises at least one protrusion or indent on an exterior surface;
   (b) positioning a cap on the cylindrical core, wherein the cap comprises a central cavity in which the cylindrical core is received coaxially so that a top end of the cylindrical core is proximal to a first end of the cap, wherein the cap comprises at least one protrusion or indent on a surface of the central cavity;
   (c) connecting a cap attachment element of the cap to a second connection part of the test apparatus; and
   (d) initiating rotation of either the first or second connection parts of the test apparatus so that the cylindrical core and the cap rotate relative to one another,
   wherein (a)-(c) may be performed in any order, and
   wherein at least one of the cylindrical core and the cap comprises at least one first protrusion so that rotation of the cylindrical core and the cap relative to one another provides a pulsed interference contact between the at least one first protrusion and at least one of a second protrusion or an indent on the other part as the at least one first protrusion moves into and out of contact with the at least one second protrusion or indent on the other part.

17. The method of claim 16, wherein the test apparatus comprises a torque sensor for measuring an amount of torque exerted on the first connection part or the second connection part, and the method further comprises:
   recording the amount of torque measured during rotation of the cylindrical core and the cap relative to one another.

18. The method of claim 16, wherein the test apparatus comprises a first motor configured to cause rotation of the first connection part, and a torque sensor for measuring an amount of torque exerted on the second connection part, and the method further comprises:
   recording the amount of torque measured during rotation of the cylindrical core and the cap relative to one another.

19. The method of claim 18, wherein the test apparatus further comprises a second motor configured to exert an axial pressure on one of the first and second connection parts, and the method further comprises:
   applying a fixed load between the cylindrical cap and the cylindrical core during rotation of the cylindrical core and the cap relative to one another.

20. The method of claim 16, wherein the cap comprises at least three protrusions and the cylindrical core comprises at least three indents, and a size of the at least three indents is substantially the same as a size of the at least three protrusions.

\* \* \* \* \*